(12) United States Patent
Olster et al.

(10) Patent No.: US 6,285,320 B1
(45) Date of Patent: Sep. 4, 2001

(54) APPARATUS AND METHOD FOR MAPPING SURFACES OF AN OBJECT

(75) Inventors: Elliot F. Olster, Hamden; Dennis J. Peterlin, Stratford; Thomas Dannenhoffer, Bethany, all of CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/389,561

(22) Filed: Sep. 3, 1999

(51) Int. Cl.$^7$ ........................................................ G01S 3/02
(52) U.S. Cl. ................................. 342/464; 342/463
(58) Field of Search .................... 342/463, 464, 342/465, 179

(56) References Cited

U.S. PATENT DOCUMENTS

| | | | |
|---|---|---|---|
| 4,949,089 | 8/1990 | Ruszkowski, Jr. | 342/52 |
| 5,148,179 | 9/1992 | Allison | 342/357 |
| 5,153,598 | 10/1992 | Alves, Jr. | 342/352 |
| 5,185,610 | 2/1993 | Ward et al. | 342/357 |
| 5,225,842 | 7/1993 | Brown et al. | 342/357 |
| 5,311,195 | 5/1994 | Mathis et al. | 342/357 |
| 5,379,224 | 1/1995 | Brown et al. | 364/449 |
| 5,389,934 | 2/1995 | Kass | 342/357 |
| 5,402,441 | 3/1995 | Washizu et al. | 375/208 |
| 5,422,814 | 6/1995 | Sprague et al. | 364/449 |
| 5,430,654 | 7/1995 | Kyrtsos et al. | 364/449 |
| 5,434,787 | 7/1995 | Okamoto et al. | 364/449 |
| 5,517,419 | 5/1996 | Lanckton et al. | 364/449 |
| 5,528,518 | 6/1996 | Bradshaw et al. | 364/561 |
| 5,546,951 | * 8/1996 | Ben-Haim | 128/702 |
| 5,576,973 | 11/1996 | Haddy | 364/516 |
| 5,600,061 | 2/1997 | Yabushita et al. | 73/178 |
| 5,614,918 | 3/1997 | Dinardo et al. | 343/882 |
| 5,629,855 | 5/1997 | Kyrtsos et al. | 364/460 |
| 5,672,840 | 9/1997 | Sage et al. | 89/41.01 |
| 5,734,348 | 3/1998 | Aoki et al. | 342/357 |
| 5,748,148 | 5/1998 | Heiser et al. | 342/457 |
| 5,777,578 | 7/1998 | Chang et al. | 342/357 |
| 5,781,150 | 7/1998 | Norris | 342/357 |
| 5,793,328 | 8/1998 | Ward et al. | 342/357 |
| 5,802,492 | 9/1998 | DeLorme et al. | 701/200 |
| 5,805,200 | 9/1998 | Counselman, III | 342/357 |
| 5,808,582 | 9/1998 | Woo | 342/357 |
| 5,847,678 | 12/1998 | Tachita | 342/357 |
| 5,848,373 | 12/1998 | DeLorme et al. | 701/200 |
| 5,872,539 | 2/1999 | Mullen | 342/357 |
| 5,878,356 | 3/1999 | Garrot, Jr. et al. | 701/1 |
| 5,884,214 | 3/1999 | Krasner | 701/207 |
| 5,902,347 | 5/1999 | Backman et al. | 701/200 |
| 5,905,461 | 5/1999 | Neher | 342/357 |
| 5,913,170 | 6/1999 | Wortham | 455/457 |
| 6,006,021 | * 12/1999 | Tognazzini | 395/500.1 |

* cited by examiner

*Primary Examiner*—Theodore M. Blum
(74) *Attorney, Agent, or Firm*—Fitzpatrick, Cella, Harper, & Scinto (57) ABSTRACT

An apparatus and method for mapping surfaces of an object, such as a structure or vehicle, that utilizes transceivers mounted on portable support structures to orient a probe to form a local global positioning satellite (GPS) system. The probe is placed on reference points of the object and information related to the reference point is input into a data processor. The processor uses the reference points are used to identify and orient the object, and a model of the object is retrieved from memory. Additional position data of the object is gathered and processed to generate a graphical image of the object being mapped. The model is compared to the mapped image of the object and structural damage is assessed. Information relating to repair procedures is output to a workstation and the area under repair can be mapped to evaluate the success of the repair procedure.

14 Claims, 8 Drawing Sheets

APPARATUS AND METHOD FOR MAPPING SURFACES OF AN OBJECT

BACKGROUND OF THE INVENTION

1. Field of the Invention

This invention relates to an apparatus and method for locating and mapping parts of an object. More particularly, this invention relates to an apparatus and method utilizing transceivers to orient a probe, similar to a GPS system; and using the probe to generate a digitized map of at least a portion of an object, which may be compared to a reference model of the same, or a geometrically similar, portion.

2. Brief Description of the Art

U.S. Pat. No. 5,389,934, "Portable Locating System" by Kass, U.S. Pat. No. 5,528,518, "System and Method for Collecting Data Used to Form a Geographic Information System Database" by Bradshaw et al., U.S. Pat. No. 5,672,840, "Method and Apparatus for Automatically Orienting a Computer Display" by Sage et al. and U.S. Pat. No. 5,872,539, "Method and System for Providing a User With Precision Location Information" by Mullen, disclose GPS systems. All of these patents are hereby incorporated by reference in their entirety herein.

Mapping surfaces of objects, such as vehicles or structures is desirable to determine the extent to which the structural integrity of the vehicle or structure may have been altered and thereby compromised. This is especially applicable to vehicles such as automobiles and helicopters that suffer impact damage. A surface mapping procedure can also be a part of a routine maintenance check to ensure that the vehicle or structure has not experienced deformation as a result of fatigue, stress or overload.

One known prior art technique to generate a surface map of a vehicle is to place a physical mark or indicia on the vehicle. The mark or indicia is laser sensitive, and by exposing the entire vehicle to laser energy (e.g., scanning with a laser scanner) it is possible to determine and record the relative positions of the marks, and thereby map the relative position of certain parts of the vehicle. This mapping technique has the drawback of requiring a source of electrical energy sufficient to perform the procedure and also necessitates transporting the vehicle to a designated location that provides the electrical energy for the laser scanning apparatus. Furthermore, this technique usually requires a hanger or large enclosure of some kind in which the laser scanner and the vehicle may be housed. This is not conducive to investigating aircraft damage at the scene of a crash, nor can the procedure be performed while the vehicle to be mapped is in service at some location remote from a laser source of appropriate type.

Additionally, the type of object that can be mapped with conventional techniques is limited to objects that can be transported to the enclosure. This precludes mapping of surfaces such as bridges, buildings and other large-sized or cumbersome objects that are not readily transported.

In another conventional surface mapping technique, locations on a multi-dimensional body, such as a vehicle, are determined by a series of measurements made by an operator using a tape measure to measure distances from some known reference surface point or points, such as a door or other appropriate part. Although this has been done for many years and is relatively accurate, it is time consuming and requires a substantial amount of record keeping and note taking to ensure that the distances are measured adequately and correctly. It also relies heavily upon the care taken in making the measurements and cross referencing to a variety of related points. This conventional technique also has the disadvantage that, in many instances, the object to be measured, such as a helicopter or other vehicle, has suffered severe damage due to impact, which may destroy or alter the position of the reference point or points.

The above mentioned drawbacks increase the difficulty associated with determining structural damage or physical deformation of an object. Thus, using conventional mapping techniques to determine the extent of damage to a structure or vehicle, such as a helicopter or automobile, is time consuming and subject to human error.

What is needed is a method and apparatus that accurately generates an image of an object by mapping particular surfaces, without being limited to predetermined locations on the object. It would also be advantageous for the apparatus to be portable so that it could be transported to the location of the object and quickly assembled and disassembled thereby permitting the mapping procedure to be performed without transporting the object.

BRIEF SUMMARY OF THE INVENTION

The instant invention provides a solution to the above-noted problems by providing a portable apparatus for mapping surfaces of an object that is suitable for measuring dimensions on the order of centimeters. The apparatus and corresponding method establishes a local satellite system that orients a probe that is then used to generate an image of selected surfaces of an object. The generated image is compared to a substantially similar reference model of the object, thereby determining surface distortions and/or deformations in the object.

Accordingly, one embodiment of the instant invention is directed to an apparatus for mapping the surface of an object that uses a plurality of orienting devices for orienting at least one probe with respect to a grid. The probe is then used to contact the object and thereby transmit contact point data to a data processing unit. The data processing unit, which is coupled to each probe, also receives probe location information related to the probe contact point on the object. The data processing unit uses the contact point data and probe location data to generate a graphical image of the object.

Yet another embodiment is directed to the processor being coupled to a storage medium, which stores a graphical model of the object. The processor retrieves the graphical model and compares it to the graphical image generated based on the probe data.

Yet another embodiment of the instant invention is directed to a method for identifying surfaces of an object. The method is performed by orienting a probe and then placing the probe at one or more known locations of the object. Dimensional data is inputted into a data processor representative of the known locations. The probe is then placed at a location of the object to be mapped; and a second set of data, representative of the location to be mapped, is input into the data processor. The data processor generates a graphical image of the object based on the data points, which represents the shape of the object. This method is implemented by either utilizing a plurality of transmitting devices to orient a probe, which is a receiver; or alternatively, using a plurality of receiving devices to orient a probe, which is a transmitter. Furthermore, the data processor retrieves a stored image of the object and compares the two images. This comparison is performed by superimposing one image on the other.

Yet still another embodiment is directed to a system utilizing a probe and orienting devices coupled to a processor. The processor generates an image of surfaces of an object to be mapped. This embodiment facilitates repair of the object by downloading and outputting data relating to repair procedures based on a comparison of the mapped surfaces of the object and a model image of the object. The processor outputs information regarding the condition of an object after a repair procedure has been performed, which is used to confirm that the repair procedure has been satisfactorily performed.

Yet still another embodiment is directed to a portable apparatus for mapping a surface of a vehicle. This includes one or more portable support structures and a plurality of transceiver devices, mounted on the support structures, transmitting signals that encompass the vehicle. One or more probes receive the signals from the transceivers thereby having their position identified on a grid. Each probe contacts the vehicle at a location, and each probe contact location is transmitted by the probe. A first data processor, with an associated input device, is coupled to each transceiver and each probe, for receiving probe contact data from the probe and receiving probe location data via the input device. The first data processor generates an image of the vehicle as a function of the probe contact data and probe location data. A network of data processors are coupled to the first data processor and transmit stored vehicle data that corresponds to the image of the vehicle to the first data processor. The first data processor receives updated data from the probe and input device, the updated data representing additional probe contact and probe location data, the first data processor determines variations between the updated data and the stored vehicle data and outputs data related to the determination.

BRIEF DESCRIPTION OF THE DRAWINGS

Like reference numbers and designations in the several views indicate like elements.

DETAILED DESCRIPTION OF THE INVENTION

The instant invention provides a new, unique, rapid and accurate way to digitally map regions of an object. It is particularly suitable for locating regions on a helicopter that are in need of repair; however, it is not limited to aircraft; and it is not limited to regions that need to be repaired. It is also suitably applied to many items that can benefit from a generalized locating apparatus and method. These include applications ranging from generalized alignments, crash investigations and structural analysis where distortions and displacements of an object are of interest.

The United States department of defense created the Global Positioning System (GPS) to allow military ships, ground vehicles, and aircraft to determine their location anywhere in the world. GPS consists of a satellite segment, a ground control segment and user receivers. Each satellite continuously broadcasts direct sequence, spread spectrum signals on which passive receivers can perform precise ranging measurements.

The apparatus and method (also referred to as a system herein) uses a portable or a fixed local global positioning satellite (GPS) system. It is specialized because the distances between satellites, used for orienting a probe, are typically between one meter and 1000 meters. Distances on an object to be measured are typically of the order of centimeters. Several satellites are used in conjunction with a pencil type GPS receiver (probe), to accurately locate surfaces of a complex object. The pencil is used at several key points to generate a reference reading. From this reference, all other locations are automatically calculated using a data processor. The pencil type receiver is suitably coupled to a geometric model, such as a CATIA model, of the object. This allows an instant reference to any location on the object and also references drawings related to that structure or surface area. This feature greatly simplifies repair of damaged areas. For example, using the pencil probe to outline the damaged region permits the operator performing a repair to know where the region is on engineering drawings. It also references the drawings, and ties into a system that describes, in detail, the repair procedure for that region.

Figure 1:
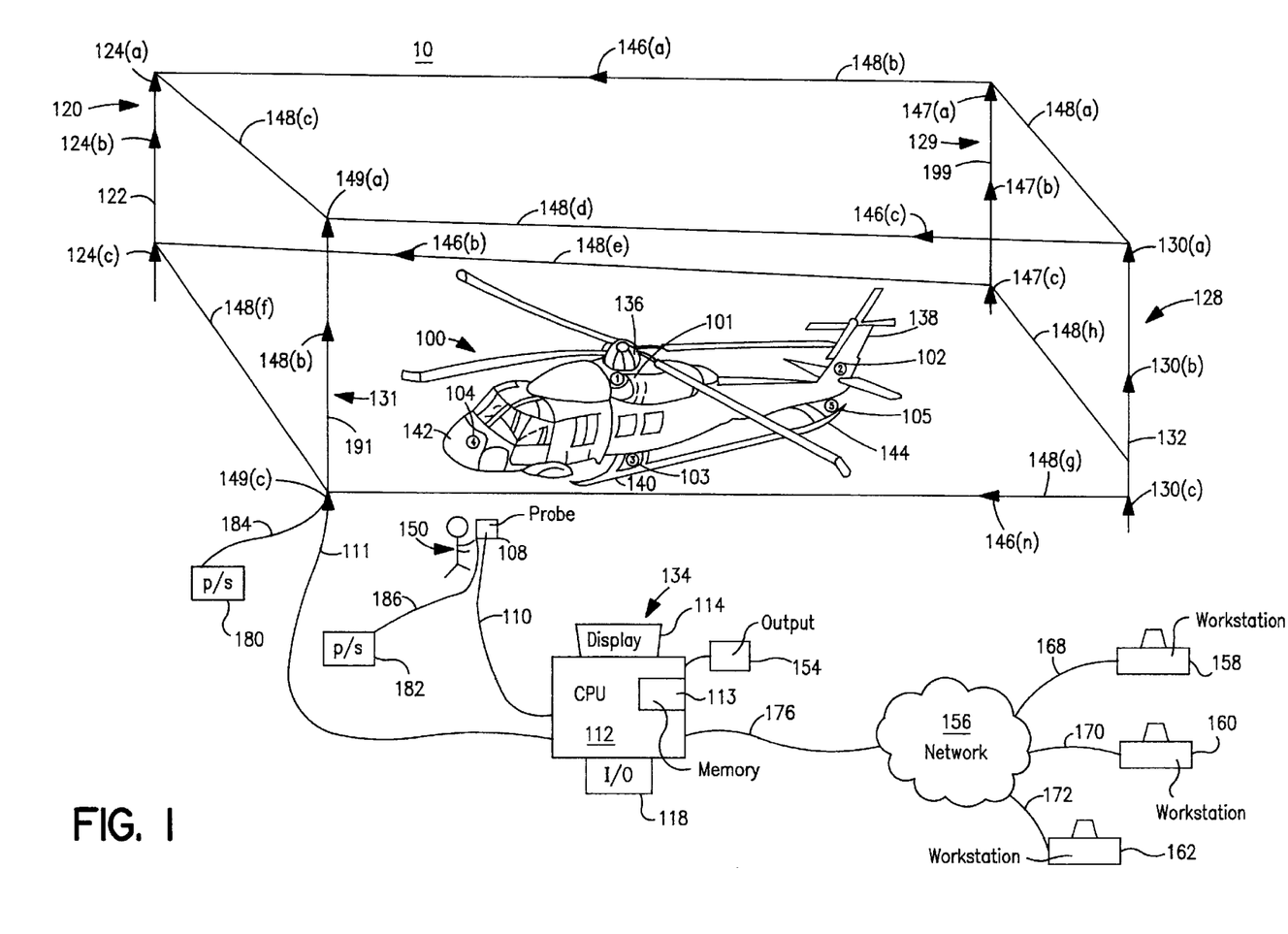
FIG. 1 shows one embodiment of the instant invention used to locate and map surfaces of a vehicle.

FIG. 1. shows an apparatus 10 for locating and mapping surfaces of an object 100. The object 100 is suitably any three-dimensional article and typically a vehicle, such as an automobile or an aircraft, such as a helicopter. However, the object is also suitably a bridge, building or other structure with surfaces that are mapped to determine dimensions and possible distortions. The object 100 is shown in FIG. 1 as a helicopter which has a plurality of regions shown as region 1, indicated as reference numeral 101; region 2, indicated as reference numeral 102; region 3, indicated as reference numeral 103; region 4, indicated as reference numeral 104; and region 5, indicated as reference numeral 105. Although any number of regions is possible, only five will be discussed herein and one skilled in the art will appreciate that the system 10 can utilize virtually any number of regions. Indeed, when more regions are mapped, a more detailed the image will be generated. For illustrative purposes, region 1, shown as 101, is located in the area below the main rotor 136; region 2, shown as 102, is located in the area of the fantail 138; region 3, shown as 103, is located in the area of a first landing gear member 140; region 4, shown as 104, is located in the area of the nose 142; region 5, shown as 105, is located in the area of a second landing gear member 144.

A first orienting system 120 comprises a first set of orienting devices, which are typically satellites and are shown as transceivers 124(a) . . . (c), arrayed in a pattern for triangularization purposes. These devices 124(a) . . . (c) are suitably designed to provide broad coverage, which is typically a horn or dish shape. Virtually any number of transceivers compatible with the design of system 10 could be mounted on support structure 122. Transceivers 124(a) . . . (c) are suitably capable of operating at a frequency between approximately 2 Gigahertz and 100 Gigahertz. The higher the frequency, the more accurate the resulting data; therefore, it is preferable to maximize the frequency used. As will be apparent to those skilled in the art, transceivers 124(a). . . (c) could also be a transmitter and receiver apparatus. Support structure 122 is suitably an elongated member such as a pole or rod. Typically, support structure 122 is a retractable pole with a base such that the structure 122 is capable of remaining erect without additional support. The base of support structure 122 suitably has tie support or retractable leg portions (not shown) or a weighted region for ease of assembly.

A second orienting system 128 comprises a second set of orienting devices, shown as transceivers 130(a) . . . (c) (although only three transceivers are shown in system 128, virtually any suitable number could be used) and support structure 132. Similar to the first orienting system 120 described above, and as will be apparent to those skilled in the art, the transceivers 130(a) . . . (c) are also suitably transmitter and receiver devices. Support structure 132 is similar to support structure 122.

The system 10 will perform satisfactorily with only three orienting devices, which have been described as transceivers. The purpose of the orienting devices is to orient a probe on a grid, such that the relative location of the probe can be traced. Orienting, as used herein, describes locating the probe using a local GPS satellite system. The orienting devices are suitably transceivers, transmitters, or receivers.

Third and fourth orienting systems 129 and 131 are also shown. These are similar to orienting systems 120 and 128. System 129 has support structure 199 and orienting devices 147(a) . . . (c). System 131 has support structure 191 and orienting devices 149(a) . . . (c). The orienting systems 120, 128, 129, and 131 are powered by transceiver power supply 180 via interconnector 184. Interconnector 111 couples the orienting devices 124, 130, 146, 147 and 149 to work station 134.

As will be apparent to those skilled in the art, the object to be mapped does not need to be within a perimeter formed by the orienting devices. Indeed, the object is adequately mapped provided it is within the field generated by the orienting devices.

Interconnectors 148(a) . . . (h) (referred to generally as 148 herein), which are suitably a wire, cable, or wireless transmission medium, such as infrared (IR) or electromagnetic (EM) couples each orienting device in the orienting systems 120, 129, 128 and 131. A fifth set of orienting devices 146(a) . . . (n) (where n is any number compatible with the design of system 10), which are also suitably transceivers, are disposed on interconnector 148. This configuration permits additional transceiver mountings.

Workstation 134 comprises a display device 114 for example a monitor, which is suitably a cathode ray tube (CRT) display, or a liquid crystal (LCD) screen; data processor 112; input device 118; and other peripheral devices, one of which shown is a printer 154. The CRT device 114 provides a screen to display data to an operator 150. The input device 118, which is typically a keyboard and/or a mouse enables the operator 150 to enter descriptive data, corresponding to a probe location, such as "top of rotor head" or "tip of nose", to data processor 112. This descriptive data is typically coded for ease of entry. Detailed codes enable accurate location data to be input to processor 112 via input device 118. The processor 112 has memory 113 such as a RAM or ROM, and adequate speed to store and retrieve graphical images of a desired number of objects. Typically a Pentium II processor is preferred; but the processor capacity depends on the quantity of data to be stored and accessed by the workstation 134. The processor 112 receives signals from the probe 108 via interconnector 110, which is suitably a wire or cable. Alternatively, the interconnector 110 is suitably an infrared (IR) signal transmission or microwave transmission. The type and quantity of peripheral devices depends on the desired performance capabilities of workstation 134 and is a design choice. The printer 154 is used to output data generated by data processor 112.

The probe 108 is typically a receiver and is powered by probe power supply 182 via interconnector 186.

Alternatively, the orienting devices 124, 130, 146, 147 and 149 are receivers and probe 108 is a transmitter. In this embodiment, the probe 108 would operate at a frequency range compatible with the orienting devices 124, 130, 146, 147 and 149. This configuration would also serve to orient the probe 108. Although only a single probe 108 is shown, any number of probes compatible with the design of system 10 could be used. The use of additional probes would increase the speed at which data relating to the vehicle 100 is transmitted to the workstation 134. The probe 108 is suitably manipulated by operator 150 to input data relating to the vehicle 100 into processor 112.

The transceivers 124(a) . . . (c), 130(a) . . . (c), 146(a) . . . (n), 147(a) . . . (c) and 149(a) . . . (c) transmit signals to orient the probe 108 in a similar fashion to a GPS system. The transceivers generally referred to as 124, 130, 146, 147 and 149 establish a three-dimensional grid and the probe 108 receives transmitted signals from the transceivers 124, 130, 146, 147 and 149. The probe location is established and any location of the probe 108 is traced. The system 10 has the advantage that the transceivers 124, 130, 146, 147 and 149 are capable of being positioned so that information relating to surfaces underneath the vehicle 100 is obtained. The location of the transceivers (e.g. 124) on the poles (e.g. 122) is adaptable and can be modified to utilize the system 10 when the vehicle 100 is distorted and has surfaces that are not readily accessible. Also, any point on the vehicle 100 that the probe 108 can contact is capable of being mapped. Thus, the system 10 is not limited to fixed points on the vehicle 100 and has the advantage that virtually any surface of the vehicle 100 can be mapped.

Once the probe 108 has been oriented on a grid generated by workstation 134, the operator 150 positions the probe 108 on a reference point, for example region 1, shown as numeral 101, on the vehicle 100. The contact of the probe 108 on the vehicle 100 generates probe contact data. The operator 150 then inputs probe location data relating to the reference point into the processor 112 via keyboard 118. Typically at least three reference points are utilized, since three points typically provide the requisite probe position data for identifying the vehicle 100. The processor 112 then matches the reference point data to a stored graphical image of vehicle 100. The operator 150 then moves the probe 108 to contact other positions on the vehicle 100, for example region 4, shown as numeral 104, which is in the nose area of the vehicle 100. The operator 150 then inputs probe location data, relating to that region and the processor 112 generates an image of the actual vehicle 100. The processor can output the generated image to the screen 114, print the image to printer 154, or transmit the image over the network 156.

Alternatively, the processor 112 generates an image of the object being mapped without retrieving a previously stored image. This enables the system 10 to produce an image of an object based on probe contact data and operator input location data without reference to a model.

Workstation 134 is suitably coupled to a network 156, via interconnector 176, which is suitably a wire, cable or wireless transmission medium. The network 156 includes other peripheral computer stations 158, 160, 162, connected by interconnectors 168, 170 and 172, respectively, which are suitably wires, cables or other signal conductor medium for receiving data from the workstation 134 and transmitting data to workstation 134. (Alternatively, these peripheral stations could be coupled by cellular transmission, which would obviate interconnecting wires 168, 170, 172.) Station 158 is suitably a main memory station capable of storing vehicle data for a variety of vehicles. This data typically includes engineering diagrams, blueprints and dimensions. Station 158 is capable of transmitting image data for a desired vehicle to workstation 134. This reduces the storage requirements of memory 113, since the image data of a selected vehicle can be downloaded to workstation 134 via the network 156. Workstations 160 and 162 are suitably other processors that can receive data, which is typically image data, from workstation 134 and transmit data to station 134. The workstation 134 suitably receives repair instructions, troubleshooting suggestions and specific tolerances for a particular object being mapped. This facilitates proper repair procedures in the field since data can be downloaded to workstation 134 from a remote location.

Figure 2:
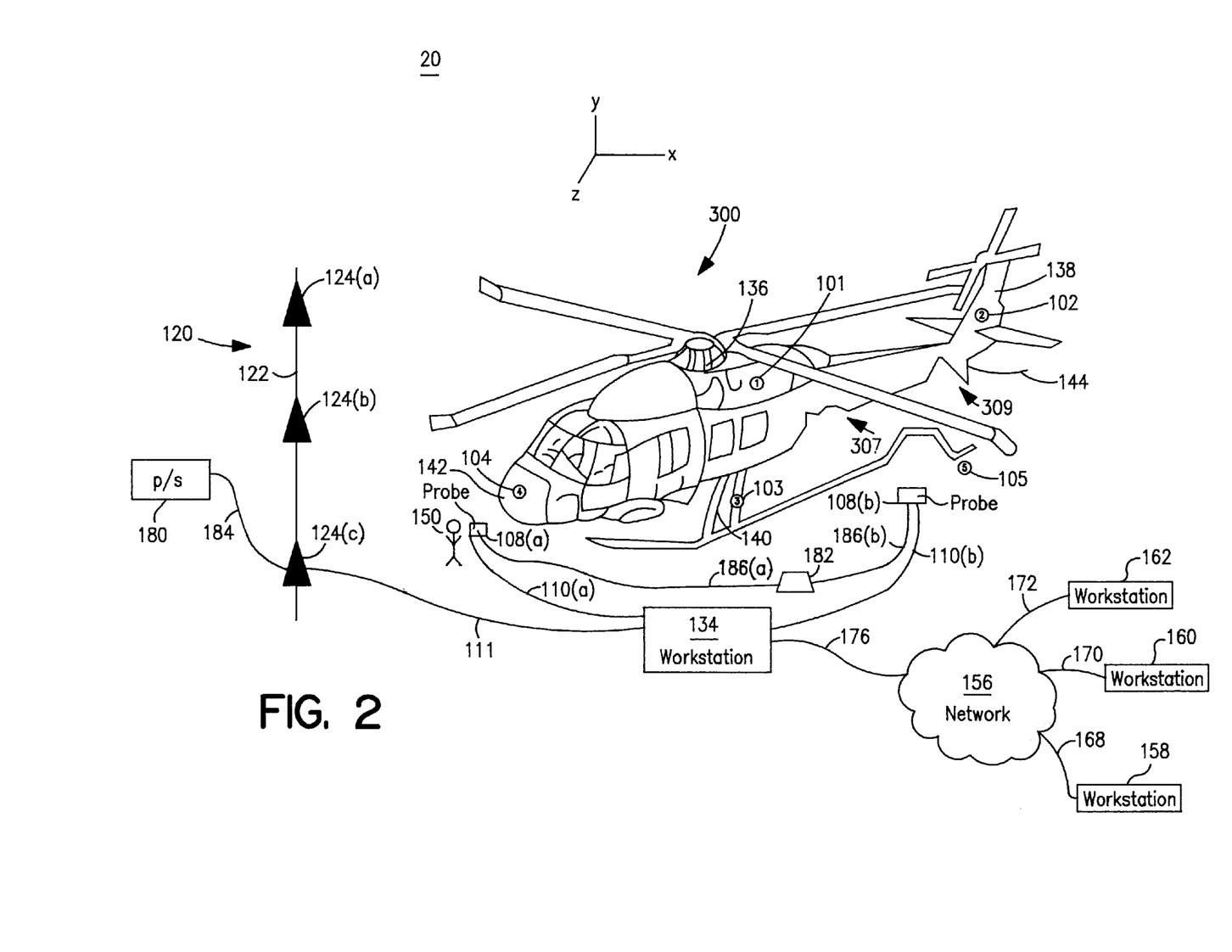
FIG. 2 shows an embodiment used to map surfaces of a vehicle that has experienced structural deformation.

FIG. 2 shows the instant invention with orienting devices, shown as transceiver sets 124(*a*) . . . (*c*) disposed about a helicopter 300 that has experienced significant structural damage. The helicopter is a three dimensional object with surfaces in the X, Y and Z orthogonal directions, and is suitably mapped on a model having three orthogonal surfaces displayed. In this embodiment the object to be mapped; specifically a helicopter, is not within a perimeter of interconnected orienting devices 124(*a*) . . . (*c*) because one orienting system 120 is used to orient probes 108(*a*) and (*b*). The system 20 enables an accurate graphical representation of the deformed vehicle 300. The vehicle 300 can be mapped and the mapped produced is suitably used for structural analysis. This analysis is used to predict energy dissipation or energy absorption in a crash or during deformation.

Regions 307 and 309, which are surfaces underneath vehicle 300, are capable of being mapped using a single orienting system 120. The mapping of an unexposed surface is possible due to the location of orienting device 124(*c*). The position of orienting devices 124 enables mapping of all surfaces of vehicle 300. Similar components described above in relation to FIG. 1 will not be discussed in relation to FIG. 2.

While FIGS. 1 and 2 depict the system as a portable system, it is also an embodiment of the instant invention that the orienting devices are mounted in a fixed location. For example, the system 10 could be implemented in a hanger or other structure and the objects, such as automobiles, aircraft, and other objects desired to be mapped, could be brought to the hanger to be examined.

Figure 3A:
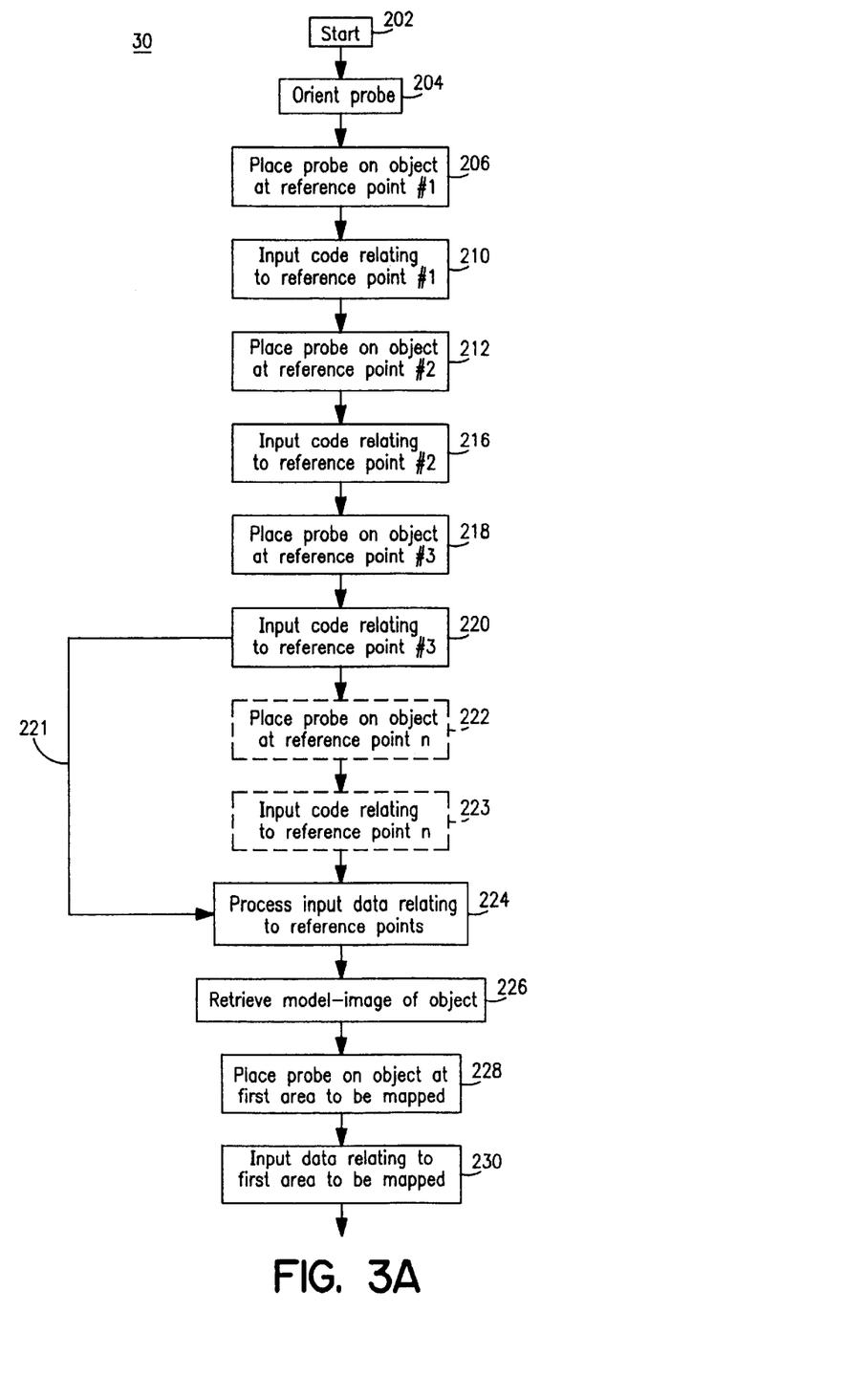
FIGS. 3A–C show a flow chart of steps to locate and map a particular surface of an object using the instant invention.
Figure 3B:
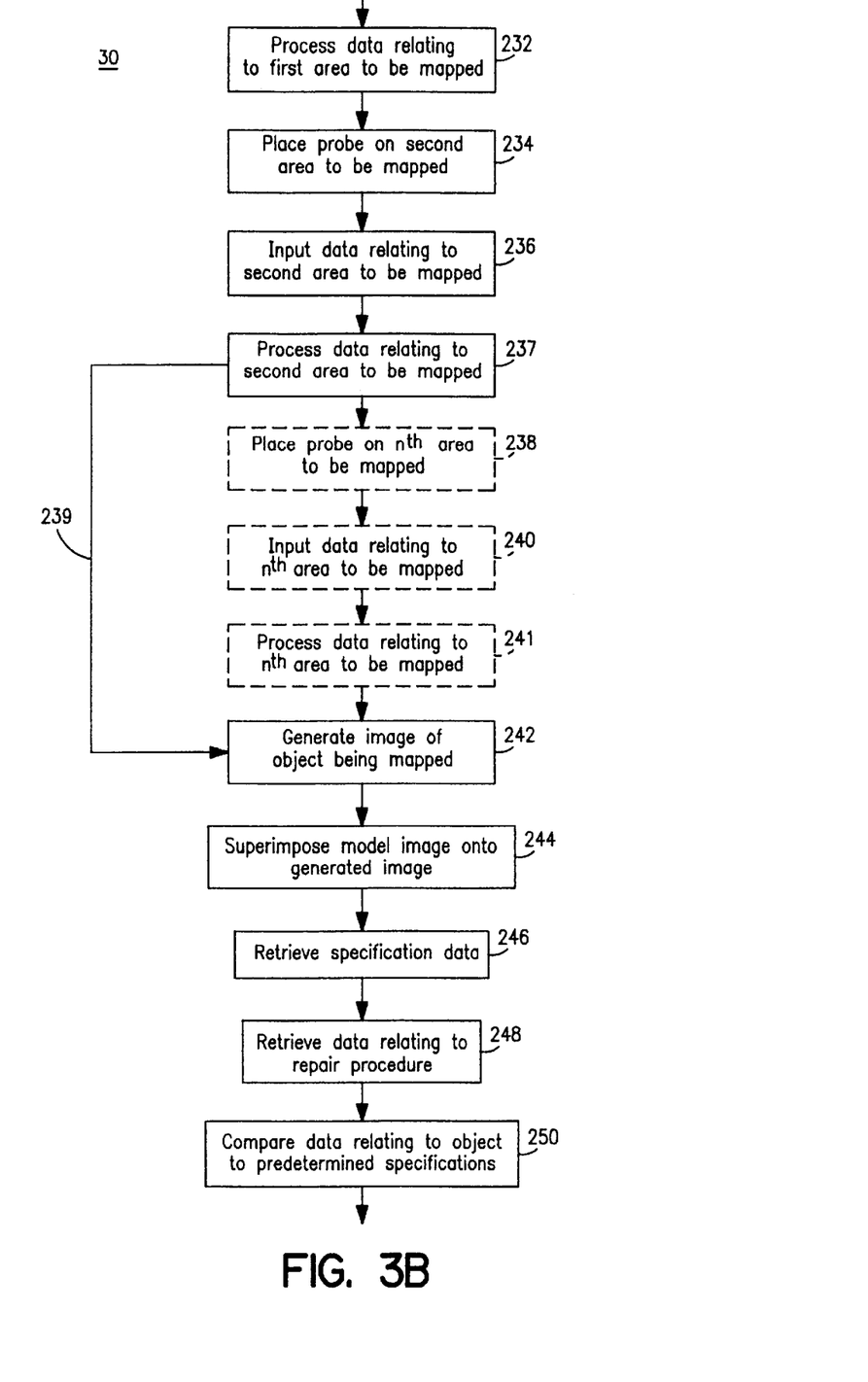
Figure 3C:
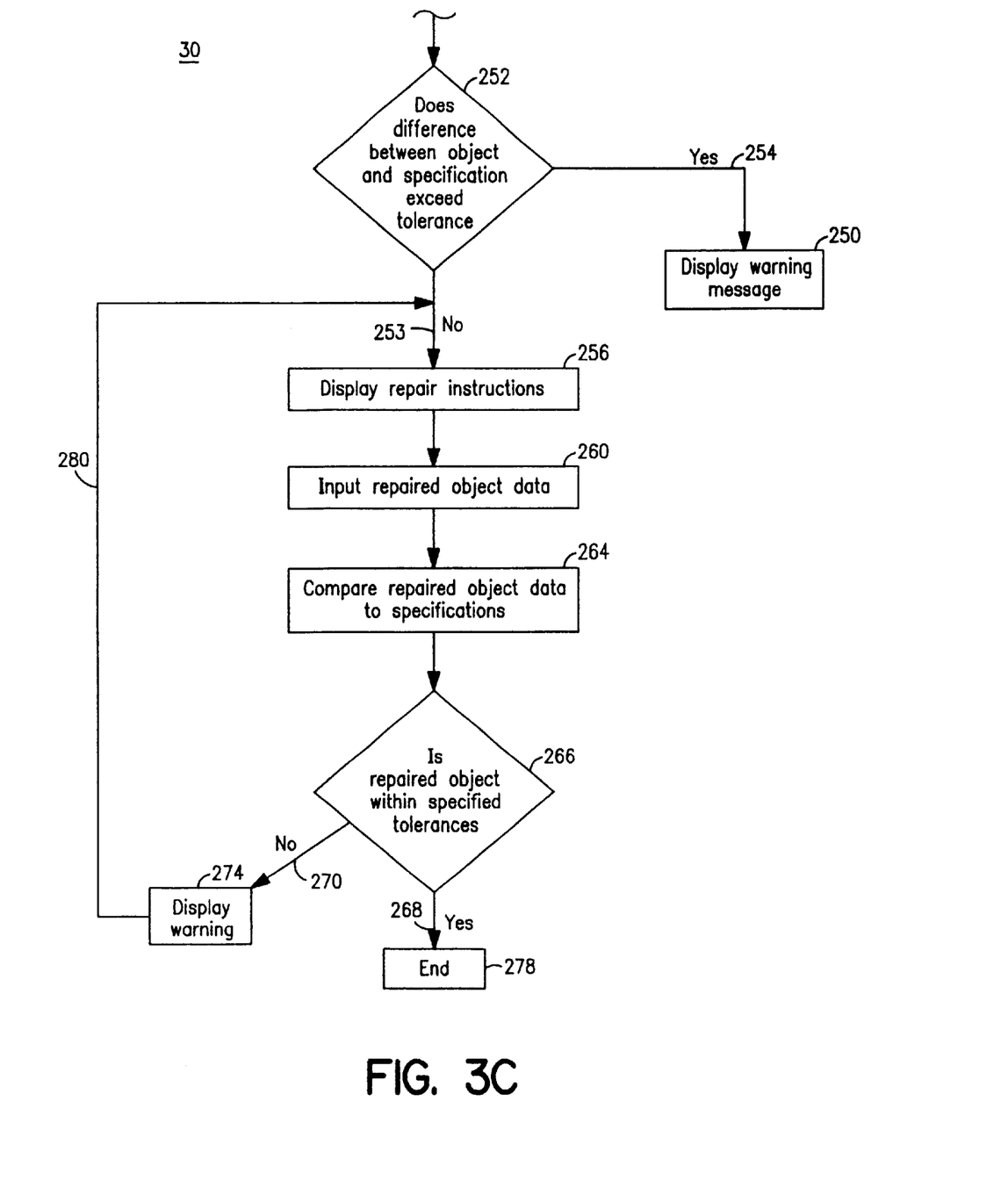

FIGS. 3A–C show a flowchart 30 of steps to map a particular region of an object. These steps are suitably stored on a computer readable medium such as ROM, RAM, compact disk, or floppy disk, and implemented by a workstation and the associated peripheral devices.

Block 202 is a start block. Block 204 shows that transceivers are used to transmit signals so that a probe is oriented relative to a virtual gridwork, such as a Cartesian coordinate system or polar coordinate system. The grid is suitably generated by a processor and displayed to an operator. At least three transceivers are used to accurately orient the probe. Block 206 shows that the probe, after being oriented, is placed on the object at a first reference point. Data related to this contact point (probe contact data) is transmitted from the probe to the processor. Block 210 shows that data related to the location of the first reference point that was contacted with the probe (probe location data) is input to a data processor. This location data is typically a code representing region 1 contacted by the probe and is typically entered by the operator. In block 212, the probe is placed on a second reference point on the object, which is different than the first, to transmit probe contact data relating to the second point of contact by the probe on the object to the processor, and in block 216, probe location data related to the second reference point is input to the data processor, and the probe contact data and probe location data is processed.

The probe is placed on a third reference point, which is different than the first and second reference points, on the object as shown in block 218. Probe contact data and probe location data, collectively referred to as probe position data, related to reference point 3 is input to data processor, as shown in block 220. Blocks 222 and 223 represent additional reference point data (n) that may be gathered in addition to the three reference points specifically discussed. If no additional reference data is used, the process proceeds to block 224 as shown by line 221. The input reference point data is processed, as shown in block 224.

The input reference data is received by the processor and is used to retrieve a stored graphic image of a model corresponding to the object being mapped, as shown in block 226.

Alternatively, the method can be implemented without retrieving a stored graphic image, in which case the processor generates an image based on the contact point data and location data relating to the object being mapped.

Data of the object being mapped is gathered by placing the probe at a first area of the object to be mapped as shown in block 228. The probe transmits the location data to the processor. An operator then inputs data to the processor indicating the region of the object that was pointed to by the probe, as shown in block 230. The processor processes the input contact data and the location data and generates an image of the object being mapped, as shown in block 232. The operator can then position the probe on a second region to be mapped, as shown in block 234, to transmit data to the processor. The operator can then input data, such as a code, representing the area on the object, as shown in block 236. Block 237 shows processing of data related to second region or area to be mapped. Blocks 238–241 indicate that the data input steps are used to gather additional probe data (n) and additional input codes (n) where (n) is any suitable number of points to map regions of the object. The greater the quantity of contact point and location data, the more accurate the image produced.

Block 242 shows that the processor generates a graphical image of the object being mapped based on the received probe contact data and input probe location data, which is typically code data. This generated image of the object being mapped is superimposed on the model image retrieved from memory, as shown in block 244.

The processor downloads from a network or otherwise retrieves (e.g., ROM memory, RAM memory, compact disk or floppy disk) data relating to specifications of the object, as shown in block 246 and data relating to the repair procedure for the object and maximum tolerances for deviation from specified dimensions for the object, as shown in block 248.

The processor compares the model image to the generated image of the object being mapped and displays the superimposed image to the operator, either on a CRT screen, printer or other output device, as shown in block 250. Block 252 represents a decision block in which the processor establishes the differences between the object being mapped and maximum tolerable distortions, and determines whether the differences exceed a particular tolerance. If the comparison results in a determination that the object is damaged in excess of a first set of specified tolerances, the processor will output a warning message that the object is critically deformed or otherwise inoperable, as shown by line 254 and block 255. This first set of tolerances protects against attempting to repair an object that is determined to be catastrophically damaged and unfit for attempted repair. If the processor, upon comparing the mapped object to the model, determines that the first set of specified tolerances are not exceeded, but that the object has been deformed or otherwise damaged, the processor will output instructions for repairing the object to correct the damage or deformation based on the amount of deformation detected by the comparison of the model image to the actual image, as shown by line 253.

Block 256 shows that the processor will generate repair data and display the data as instructions to the operator via a display screen coupled to the processor. It is a feature of this invention that the processor downloads schematic diagrams showing cut-away views of the object being mapped. These typically include blueprints and engineering design drawings. This facilitates repair procedures since the operator has three-dimensional information that can help the operator avoid damaging components that are not visible from the exterior of the object.

Block 260 shows that the processor receives updated object data that is input after a remedial or repair action has taken place on the object. The processor processes the updated information and compares the updated object information to the model image of the object, as shown in block 264. The processor determines whether the updated object data is within the predetermined specifications, as shown in block 266. If the updated data from the object conforms to the specified tolerances, the process will proceed to end block 278 and output a message that the object has been satisfactorily repaired. If the updated data does not conform to the specified tolerances, a warning message will be produced, as shown by line 270 and block 274. Line 280 shows that the process will return to block 256 until the object map data shows the object is within specified tolerances or the operator terminates repair procedures.

Figure 4:
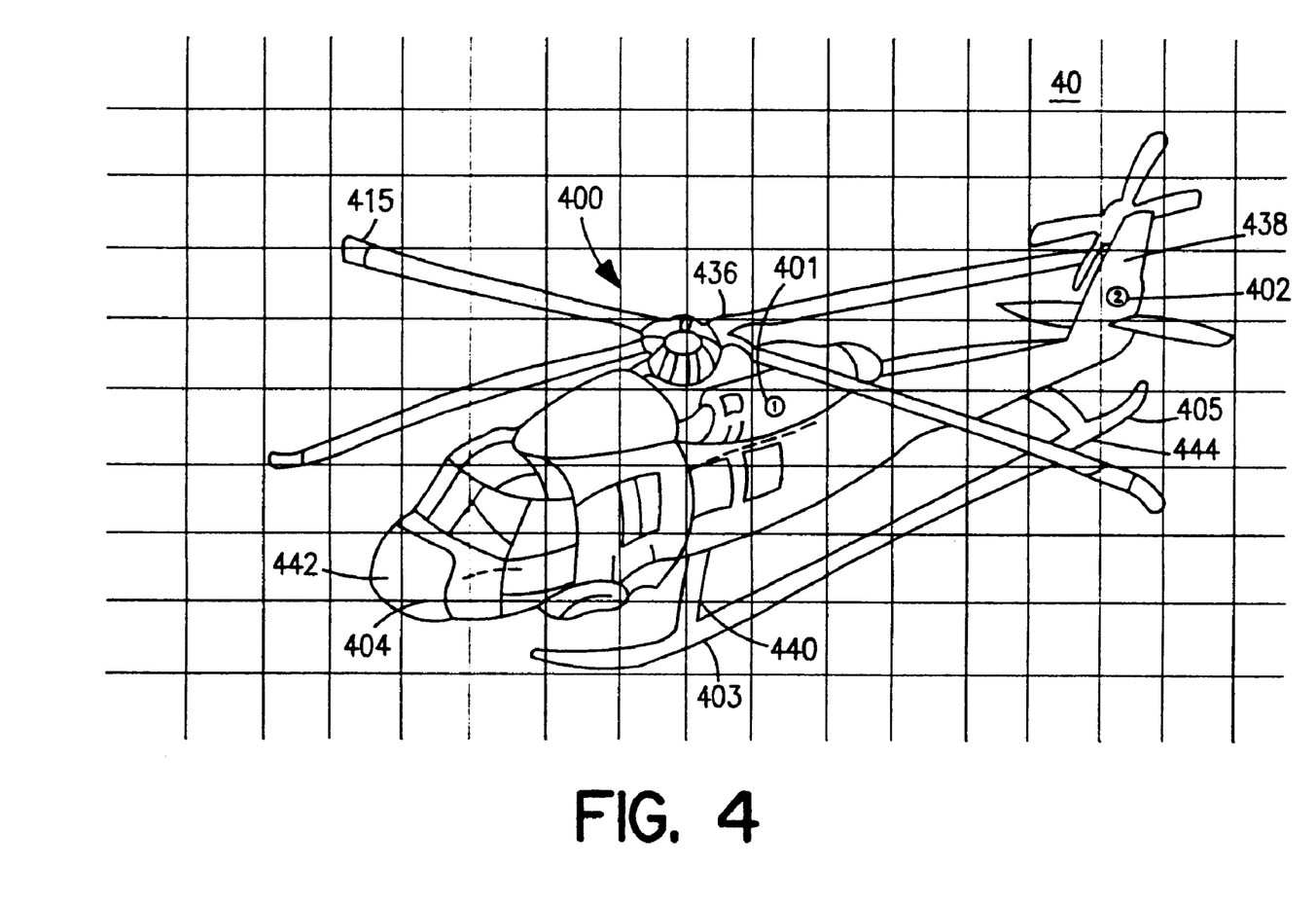
FIG. 4 shows a graphical model of an object.

FIG. 4 shows a model image 40 of a graphic model of a vehicle 400. This graphic model image 40 is stored in memory and is downloaded upon request to a workstation. This type of model data is suitably stored on a floppy diskette, compact disc, or stored at a remote location in ROM or RAM memory and downloaded on an as-needed basis. As shown in FIG. 4, particular areas of the vehicle are identified. These are, for example, an area below the main rotor 436, fantail portion 438, blade area 415, nose portion 442, and landing gear support members 440 and 444. Regions 401, 402, 403, 404, and 405 are also shown, which correspond to various probe contact points. This model is typically a CATIA three-dimensional model, or a model generated from design drawing. Although five areas are discussed, it is apparent to those skilled in the art that the degree of detail available on the model is typically refined to centimeters. Therefore, the number of regions is a function of the degree of detail desired.

Figure 5:
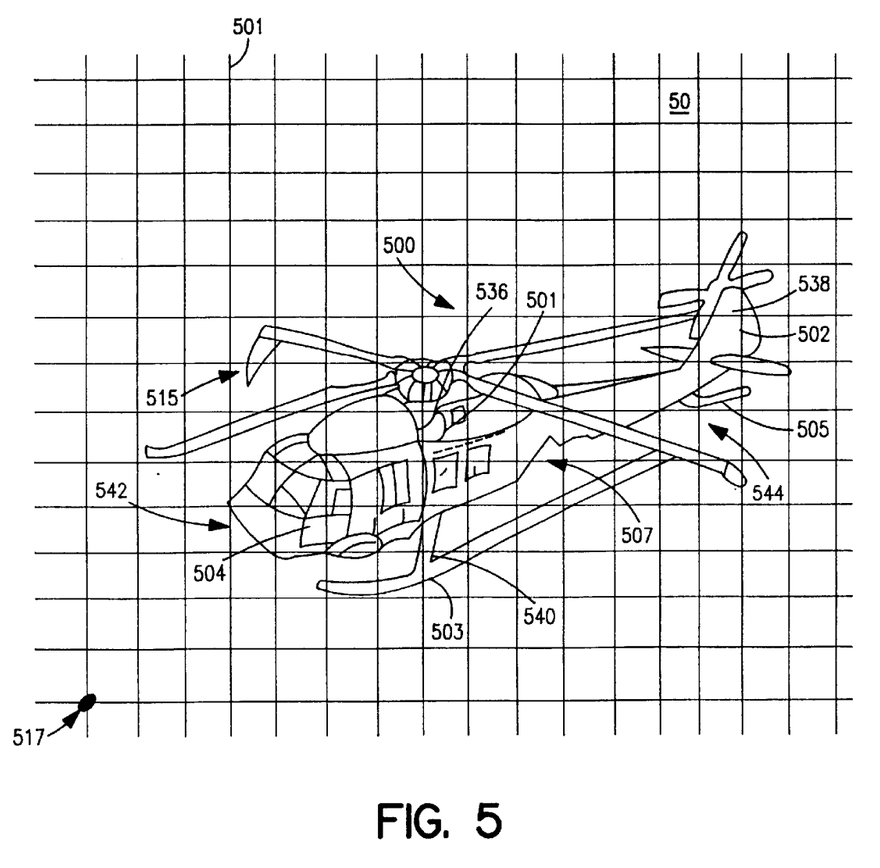
FIG. 5 shows a mapped image of a deformed object.

FIG. 5 shows grid 501, with origin 517. The grid 501 is suitably stored in memory and is used to orient a probe. The probe is oriented with respect to the grid 501 to generate an actual image 50 of object 500, which has been structurally deformed. The object image 500 is capable of being mapped without correlation to a model; but rather, the result of probe contact data and location data input to a data processor. Thus, it is an embodiment of the instant invention to generate an image of an object regardless of a previously stored image. As shown in FIG. 5, an area beneath the main rotor 536, fantail area 538, nose area 542, and first and second landing support members 540 and 544, respectively are identified. The nose portion 542, which is identified with probe contact data on 504 is deformed. Similarly, fuselage area 507, rotor tip 515 and landing support member 544 are also deformed. These areas are identified with probe contact data gathered by positioning the probe on those points and inputting probe location data relating to the respective points. For example, location 502 has a code indicating that it is in the fantail area 538; location 505 has a code indicating it is a landing support member. Areas 503, which is a first landing support member location code is not deformed, nor is location 501, which is a code for area beneath the main rotor 536.

Figure 6:
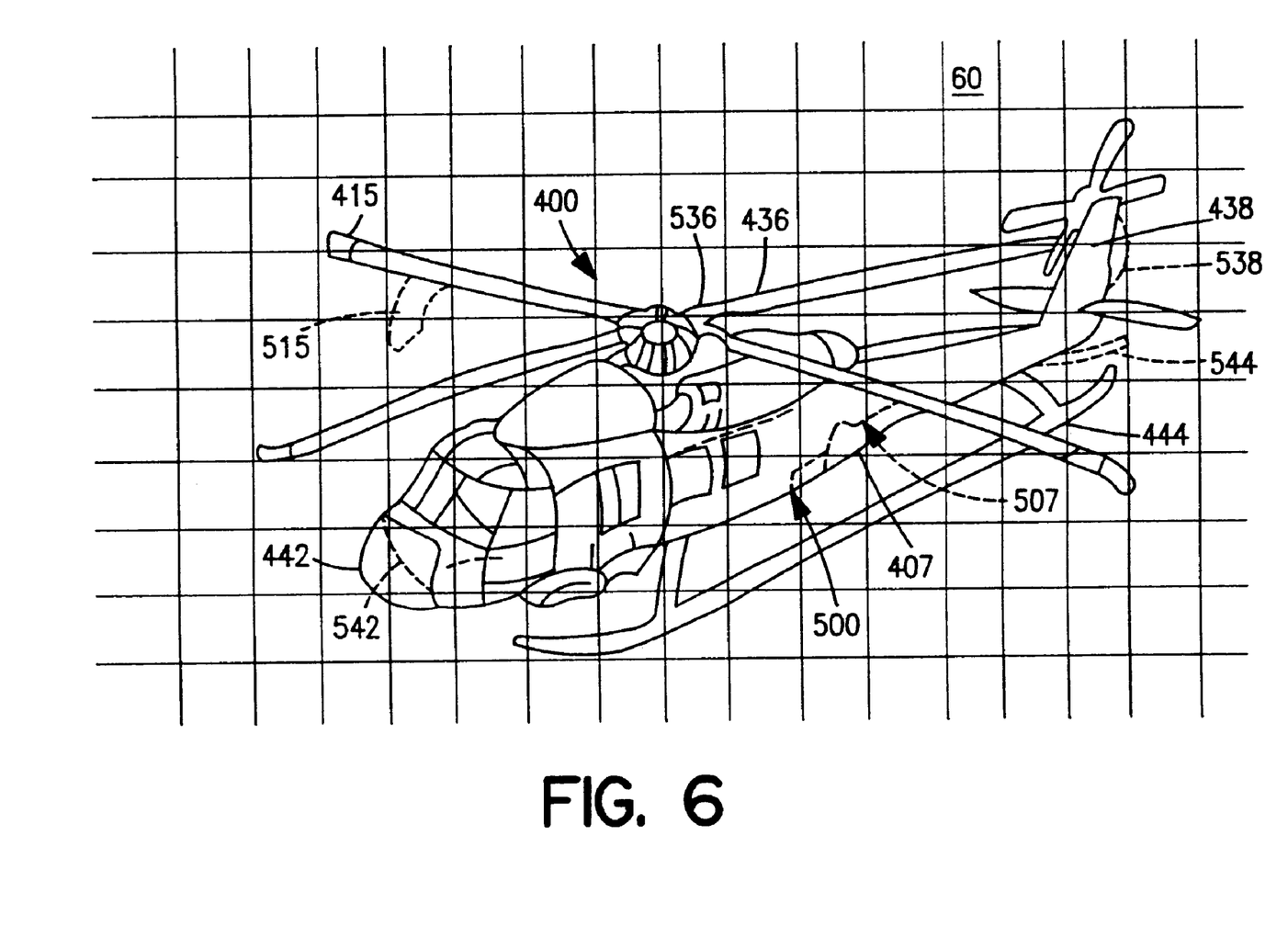
FIG. 6 shows a mapped object superimposed upon a graphical model of the object.

FIG. 6 shows a mapped image 60 of an object image 500 superimposed upon a model image 400. This imposition shows distortions and deformations of the object mapped; specifically areas 515, 542, 507, 544 and 538. The superimposed image 60 is suitably displayed to an operator illustrating the extent of the deformities of the object 500 when compared to the corresponding model image 400 areas; specifically 415, 442, 444 and 438. The processor can update the images as repair procedures are performed to illustrate locations of the object that require attention. As shown in FIG. 6, the object 500 has locations 507, 515, 538, 542, 540 and 544, which are displaced from the model locations 407, 415, 438, 442, 440 and 444, respectively. This image representation provides an accurate representation of the amount of deformation a vehicle has experienced.

An example using the apparatus and method of the instant invention will now be described referring to all of the Figures. This example is merely one embodiment of the instant invention and is not intended as limiting the invention to the example discussed.

The nose portion 104 of vehicle 100 has been damaged due to impact with the earth and the vehicle 100 is located at the site of the crash. System 10 can be deployed at the site by positioning support poles 122, 132, 191 and 199 (with associated orienting devices) and stringing interconnector 148 hanging orienting devices 146(*a*) . . . (*n*) between the support poles 122, 132, 191, and 199. It should be noted that the vehicle 100 does not have to be with the perimeter formed by the orienting devices and support structures. The orienting devices 124(*a*) . . . (*c*), 130(*a*) . . . (*c*), 146(*a*) . . . (*n*), 147(*a*) . . . (*c*) and 149(*a*) . . . (*c*) transmit signals at a frequency between 2 GHz and 100 GHz to orient probe 108, which receives the transmitted signals, on a grid that is generated by data processor 112.

Once the probe 108 has been oriented on the grid, the operator 150 positions probe 108 on a first identified region of the vehicle 100, for example region 1, shown as 101, that appears to be relatively undamaged. This first identifiable region serves as the first reference point. The operator 150 then inputs, via keyboard or mouse 118, data into the processor 112 indicating that region is, for example, an area below the main rotor 136. The data is suitably a code that is processed by the processor and represents the area below the main rotor. The probe contact data and probe location data are suitably processed as probe position data by the data processor 112. Every area of the vehicle can have an associated code so that the processor can correlate a probe location to an area on the vehicle. The operator 150 then positions the probe 108 at a second identifiable position, for example region 2, shown as numeral 102 on vehicle 100, and inputs data into processor 112 indicating that region 2 is an area on the fantail 138. This serves as the second reference point. The operator 150 then positions the probe 108 at a third identifiable position, for example, region 3, shown as 103, and inputs data into the processor 112 indicating that the region is a first landing support member 140.

The number of identifiable reference positions can be increased; but a minimum number to accurately identify and precisely orient the vehicle 100 is required. Typically three identifiable reference points on the vehicle 100 are necessary for accurate mapping of the vehicle 100. Once the requisite number of identified reference positions have been located, the processor 112 retrieves, from memory, a graphical model representation of the particular vehicle 100. This model is suitably a CATIA 3-dimensional graphic image. The graphical model is typically stored in memory 113, or downloaded from external memory such as floppy diskettes, compact disks, or downloaded via network 156 from a remote station 158.

The operator 150 then positions the probe 108 at a damaged area of the vehicle 100. In the present example, the operator 150 positions probe 108 at region 4, shown as 104, and inputs data indicative of that position as a nose portion 142. The processor 112 uses the input nose position data and establishes the amount of deformation of the vehicle 100 based on a comparison of the actual data relating the reference points to the damaged area point and the graphic model. The operator 150 can then position the probe 108 at region 5, shown as numeral 105, and input data indicating that the region is a second landing support member 144. The operator 150 can position the probe 108 in any number of locations on the vehicle 100 to enable the processor 112 to generate an image of the deformed vehicle 100. The greater the number of probe position points, the more accurate the mapping of the vehicle 100. The result of the probe and data inputs is a digital map of the vehicle generated by the processor 112 and stored in memory 113, floppy diskettes or transmitted over the network 156.

The processor 112 can superimpose the image of the deformed vehicle 100 on the model graphical image to provide a visual representation of the regions in which the deformed vehicle 100 differs from the model. This data can be displayed on screen 114, printed to printer 154, or transmitted via network 156 to a remote location 158, 160, 162. The processor 112 also stores in memory 113 or downloads from the network 156, data related to the repair of the portion of the vehicle 100 that has been damaged. The processor 112 is suitably programmed with tolerance specification data such that when a particular surface or region of the vehicle 100 is not within a specified tolerance, the processor 112 will retrieve data relating to repair procedures or a message that the vehicle 100 is inoperable. The information relating to suggested repair procedures is displayed on screen 114 or printed using printer 154. This feature enhances the ability to repair a vehicle 100 in the field since the instructions for each damaged surface are provided by the processor 112 to the operator 150. The workstation 134 does not need to store all of the repair data since it can be downloaded from the network 156 on an as-needed basis.

There are numerous other uses for the mapping apparatus and method disclosed herein; for example, in crash investigations of air, land and sea vehicles, it provides a rapid and accurate estimate of distortions and displacements. It also has uses in confirming that a vehicle has not suffered damage that will compromise the structural integrity of the vehicle.

The instant invention is also suitable for applications in determining the structural integrity of objects such as bridges, buildings, etc. Particularly where earthquake damage, decay, or settling is suspected. The magnitude of the frequencies enables accurate dimensional analysis in the range of centimeters to be obtained, which can determine minor, on the order of centimeters, distortions and/or deformations. This is useful to gather information relating to cracks and cavities in building walls, both interior and exterior, and bridge support members. The portable nature of the invention enables deployment in a multitude of settings.

While the invention has been described above with reference to specific embodiments thereof, it is apparent that many changes, modifications and variations can be made herein. Accordingly, it is intended to embrace all such changes, modifications and variations that fall within the spirit and broad scope of the appended claims.

What is claimed is:

1. A system for mapping the surface of an object comprising:
   a plurality of orienting devices;
   at least one probe, for contacting the object and being adapted to be oriented by the orienting devices; and
   a data processing unit, coupled to each probe, for receiving probe position data relating to locations on the object and generating a graphical image of the object based on the probe position data,
   wherein one or more of the orienting devices are transceivers and the probe is a receiver.

2. The system according to claim 1 further comprising:
   a storage medium, coupled to the data processing unit, for storing a graphical model image of the object,
   wherein the probe position data includes probe contact data that represents a probe contact position and probe location data that represents a probe location, and the data processing unit correlates a first set of probe position data to the graphical representation and uses a second set of probe position data to generate a second graphical image based on the second set of probe position data.

3. The system according to claim 2, wherein the orienting devices are positioned to obtain data relating to a surface on an underside of the object.

4. The system according to claim 1, wherein the frequency of the signals transmitted by the transceivers are of the magnitude between approximately two gigahertz and one-hundred gigahertz.

5. The system according to claim 1, wherein one or more of the orienting devices are receivers.

6. The system according to claim 1, wherein the orienting devices are mounted on a portable support structure.

7. The system according to claim 1, wherein the data processing unit is coupled to a network of peripheral data processing units, for transmitting and receiving data between the data processing unit and the peripheral data processing units.

8. The system of claim 1, further comprising a plurality of probes, wherein one of the plurality of probes is a transmitter.

9. A method for identifying surfaces of an object comprising:
   transmitting signals from a plurality of orienting devices to orient a probe;
   placing the probe at a plurality of known locations of the object;
   inputting data into a data processor representative of each of the known locations;
   placing the probe at an unidentified location of the object;
   inputting data into a data processor representative of the unidentified location; and generating a graphical image of the object based on the input data, wherein one or more of the orienting devices are transceivers and the probe is a receiver.

10. The method according to claim 9 further comprising:

retrieving a stored model image of the object from memory;

comparing the generated graphical image of the object to the stored model; and outputting an image of the generated image superimposed on the stored model image of the object.

11. A method for mapping a surface of an object stored on a computer-readable medium comprising the steps of:

orienting a probe relative to an object using three or more orienting devices;

receiving data related to three or more reference points on the object;

retrieving a graphical model of the object based on the received reference point data;

receiving data related to an unidentified area of the object;

generating a graphical image of the object based on the received reference point data and the input data related to an unidentified area of the vehicle;

comparing the graphical image of the object to the graphical model of the object;

retrieving information related to repairs for areas of the object in which the graphical image differs from the graphical model; and outputting the retrieved information related to repairs, wherein one or more of the orienting devices are transceivers and the probe is a receiver.

12. The method according to claim 11, further comprising the step of:

outputting the graphical model overlaying the graphical image so as to illustrate any variations between the graphical model and the graphical image.

13. The method according to claim 12, wherein a warning message is generated when the graphical image of the object and the graphical model do not correspond within a predetermined tolerance.

14. A portable apparatus for mapping a surface of a vehicle comprising:

one or more portable support structures;

a plurality of transceiver devices, mounted on the support structures, transmitting signals that encompass the vehicle;

one or more probes, for receiving the signals from the transceivers thereby having its position identified on a grid, each probe contacting the vehicle at a location, and each probe contact location being transmitted by the probe;

a first data processor, with an associated input device, coupled to each transceiver and each probe, for receiving probe contact data from the probe and receiving probe location data via the input device, and generating an image of the vehicle as a function of the probe contact data and probe location data;

a network of data processors, coupled to the first data processor, for transmitting stored vehicle data that corresponds to the image of the vehicle to the first data processor, wherein the first data processor receives updated data from the probe and input device, the updated data representing additional probe contact and probe location data, the first data processor determining variations between the updated data and the stored vehicle data and outputting data related to the determination.

* * * * *